(12) United States Patent
Movshovich et al.

(10) Patent No.: US 6,930,677 B2
(45) Date of Patent: Aug. 16, 2005

(54) METHOD AND SYSTEM FOR PERFORMING PAL CHROMA TWO-LINE VERTICAL COMBING

(75) Inventors: Aleksandr M. Movshovich, Santa Clara, CA (US); Brad A. Delanghe, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 358 days.

(21) Appl. No.: 10/184,568

(22) Filed: Jun. 28, 2002

(65) Prior Publication Data

US 2004/0001070 A1 Jan. 1, 2004

(51) Int. Cl.$^7$ ................................................ G09G 5/00
(52) U.S. Cl. ...................... 345/204; 345/589; 345/600; 348/665; 348/667
(58) Field of Search ................................ 345/204, 690, 345/589, 600, 530, 561; 348/663, 665, 667

(56) References Cited

U.S. PATENT DOCUMENTS

| | | | | |
|---|---|---|---|---|
| 4,707,732 A | * | 11/1987 | Matono et al. ............. 348/668 |
| 5,134,467 A | * | 7/1992 | Kim ............................ 348/663 |
| 5,526,060 A | * | 6/1996 | Raby ........................... 348/663 |
| 6,300,985 B1 | * | 10/2001 | Lowe et al. ................. 348/665 |
| 6,459,457 B1 | * | 10/2002 | Renner et al. .............. 348/668 |
| 6,462,790 B1 | * | 10/2002 | Lowe et al. ................. 348/665 |

* cited by examiner

*Primary Examiner*—Matthew C. Bella
*Assistant Examiner*—Po-Wei (Dennis) Chen
(74) *Attorney, Agent, or Firm*—Sawyer Law Group LLP

(57) ABSTRACT

A method and system for performing combing for PAL chroma data for a display having a plurality of lines is disclosed. The display is capable of depicting a frame including a horizontal boundary having a top edge and a bottom edge. The top line of the plurality of lines is at the top edge of the horizontal boundary, while a bottom line of the plurality of lines is at the bottom edge of the horizontal boundary. The method and system include replacing bottom line chroma data with previous line chroma data for the top line. The method and system also include replacing top line chroma data with subsequent line chroma data for the bottom line. The method and system can also provide three-line combing chroma data for a remaining portion of the plurality of lines.

7 Claims, 4 Drawing Sheets

US 6,930,677 B2

1

METHOD AND SYSTEM FOR PERFORMING PAL CHROMA TWO-LINE VERTICAL COMBING

FIELD OF THE INVENTION

The present invention relates to graphics systems, and more particularly to a method and system for performing PAL chroma two-line vertical combing.

BACKGROUND OF THE INVENTION

In graphics systems, data for a particular frame includes both luma (luminance) and chroma (chrominance) data. In order to process the graphics data, the luma and chroma are separated. The mechanism used to separate the luma and chroma data depends upon the standard with which the data complies. One such standard is PAL. In PAL, luma and chroma data are carried predominantly at two different frequencies. In PAL, frequencies below 3.1 MHz are assumed to be luma. Thus, one conventional method for separating the luma and chroma data uses a band pass filter to remove the low frequency luma data from the chroma data. However, there is some crosstalk between the luma and chroma data. Consequently, some luma data will exist above 3.1 MHz and some chroma data resides below 3.1 MHz. In order to better separate the luma and chroma data, another process is used.

FIG. 1 depicts a high-level block diagram of a conventional system 10 for separating PAL luma and chroma data. Typically, luma and chroma data are carried predominantly at two different frequencies. The conventional system 10 includes a first line delay 16 and a second line delay 18, adder 20, a divide-by-two block 22 and a subtractor 24. Each line delay 16 and 18 provides a delay equal to one line being processed. The system 10 also includes comb band pass filter (BPF) 26, notch BPF 28, comb/notch selector 30, color/bypass selector 32 and subtractor 36.

FIG. 2 depicts a conventional method 50 for separating PAL luma and chroma data utilizing conventional three-line combing. The conventional method 50 is generally used by the system 10. Consequently, the conventional method 50 is described in conjunction with the system 10. Referring to FIGS. 1 and 2, the method 50 and the system 10 assume that the data does not change radically from line to line. Thus, the method 50 and the system 10 approximate data for the current line using a previous line and a next line. A portion of the video signal is separated at the node 11, via step 51. Thus, a portion of the video signal is transmitted along the line 12, while another portion is transmitted along the line 14. The data is sent through two line delays 16 and 18, via step 52. The output of the second delay 18 is data for the previous line. The data at the node 17 between the line delays 16 and 18 is data for the current line. Data taken from the node 11 is data for the next line. The data for the previous, current and next lines are thus present in the system 10 because of the line delays 16 and 18.

The previous line and next line signals are combined, via step 53. Step 53 is performed by combining the signal from the line 12 with the signal being output by the second line delay 18 using the combiner 20. Because the signal from the second line delay 18 is two lines ahead of the signal taken from the node 11, chrominance data is approximately canceled out when the two signals are combined. The output of the combiner 20 is two times the luma data for the current line. Note that although the output of the combiner 20 is termed twice the luma data for the current line, the output

2 actually approximates the twice luma data for the current line because the previous and next lines were used.

This data is then cut in half, using the divide-by-two block 22, via step 54. Thus, the output of the divide-by-two block 22 is the luma data for the current line. The luma data output by the divide-by-two block 22 is considered to be for the current line because data for the current line is taken from the node 17, between the line delays 16 and 18.

The luma data is then subtracted from the data for the current line, via step 55. This step is performed using the subtractor 24. Thus, the output of the subtractor 24 is the chroma data. The subtractor performs step 55 by inverting the luma data from the divide-by-two block 22 and adding the data for the current line, taken from node 17. The chroma data is provided to the comb BPF 26, while the data for the current line is provided to the notch BPF 28, via step 56. The appropriate data is selected by the notch selector 30 and color/bypass selector 32, via step 57. The chroma data can thus be output via the line 34. The chroma data is then subtracted from the data, using the subtractor 36, via step 58. Consequently, the luma data and the chroma data can be output by the conventional system 10.

Although the conventional system 10 and method 50 function adequately in most cases, one of ordinary skill in the art will readily recognize that the conventional system 10 and method 50 do not work well at certain rough edges. FIG. 3 depicts a portion of a frame 60 in a display. The frame 60 includes such a boundary 90. The boundary 90 is between polygons 70 and 80. However, the boundary 90 could be between other items. The edge 90 is rough because the polygons 70 and 80 have very different colors. For example, the polygon 70 may be dark, while the polygon 80 may be light. The portion of the polygon 70 shown includes lines 61, 62 and 63. The portion of the polygon 80 shown includes lines 64, 65 and 66. The edge 90 is between lines 63 and 64.

Referring to FIGS. 1–3, the conventional system 10 and method 50 combine data for a previous line and a next line in order to obtain luma data, which is also used to obtain the chroma data. When line 62 is the current line, taken from node 17, line 61 is the previous line and line 63 is the next line. Consequently, the luma and chroma data output from the divide-by-two block 22 and the subtractor 24 are as desired. However, when line 63 is the current line taken from the node 17, line 62 is the previous line and line 64 is the next line. However, line 64 is part of the other polygon 80, taken from the other side of the edge 90. Consequently, when the line 64 is combined with the line 62, the resultant will not be close to the luma data for the current line. This is because the chroma data changes radically due to the boundary 90. In other words, the assumptions made for performing the conventional three-line combing of the method 50 no longer hold. As a result, the appearance of the frame near the boundary 90 is incorrect.

Accordingly, what is needed is a system and method for providing PAL chroma data while reducing the incongruities introduced around rough boundaries. The present invention addresses such a need.

SUMMARY OF THE INVENTION

The present invention provides a method and system for performing combing for PAL chroma data for a display having a plurality of lines. The display is capable of depicting a frame including a horizontal boundary having a top edge and a bottom edge. The top line of the plurality of lines is at the top edge of the horizontal boundary, while a bottom line of the plurality of lines is at the bottom edge of the horizontal boundary. The method and system include replacing bottom line chroma data with previous line chroma data for the top line. The method and system also include replacing top line chroma data with subsequent line chroma data for the bottom line. The method and system can also provide three-line combing chroma data for a remaining portion of the plurality of lines.

According to the system and method disclosed herein, the present invention provides a method and system for performing two-line combing of PAL chroma that reduces artifacts of separation of PAL luma and chroma data.

DETAILED DESCRIPTION OF THE INVENTION

The present invention relates to an improvement in graphics systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides a method and system for performing combing for PAL chroma data for a display having a plurality of lines. The display is capable of depicting a frame including a horizontal boundary having a top edge and a bottom edge. The top line of the plurality of lines is at the top edge of the horizontal boundary, while a bottom line of the plurality of lines is at the bottom edge of the horizontal boundary. The method and system include replacing bottom line chroma data with previous line chroma data for the top line. The method and system also include replacing top line chroma data with subsequent line chroma data for the bottom line. The method and system can also provide three-line combing chroma data for a remaining portion of the plurality of lines.

The present invention will be described in terms of a system having certain components and a method having certain steps. However, one of ordinary skill in the art will readily recognize that the present invention will operate effectively for other systems having other and/or different components and methods having additional and/or different steps.

Figure 1:
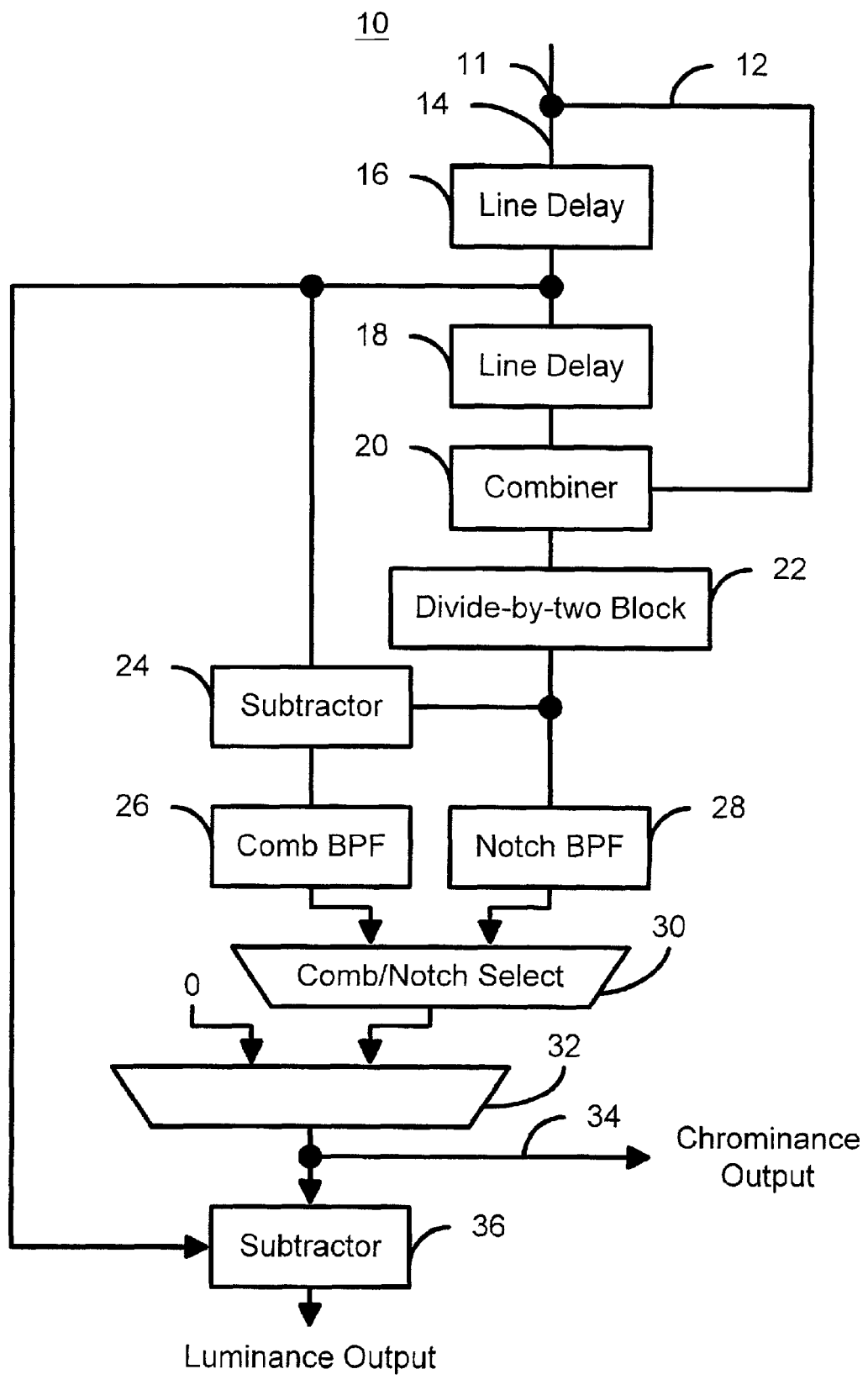
FIG. 1 is a high-level block diagram of a conventional system for separating PAL luma data from PAL chroma data.
Figure 2:
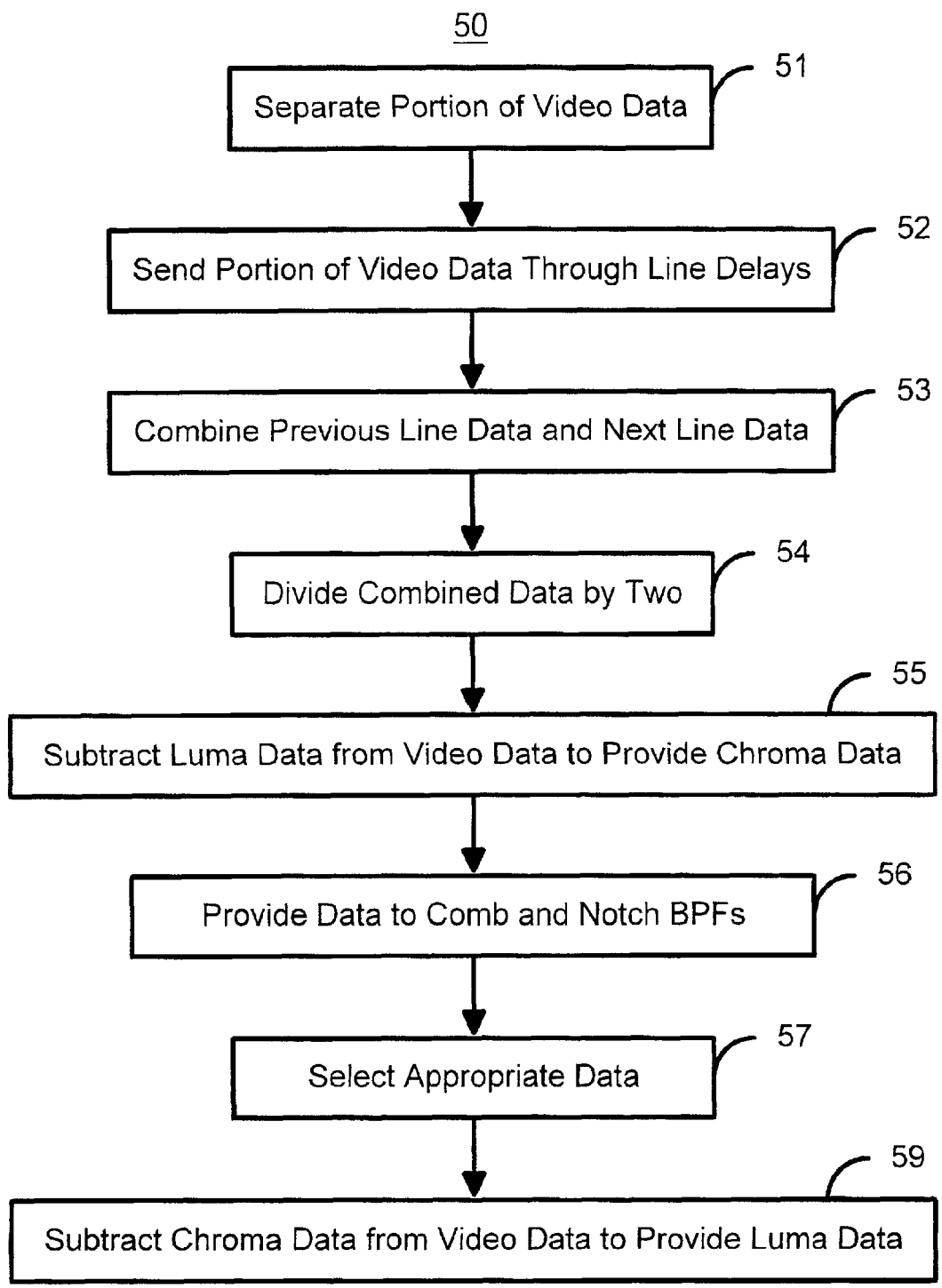
FIG. 2 is a high-level flow chart block diagram of conventional method for separating PAL luma data from PAL chroma data.
Figure 3:
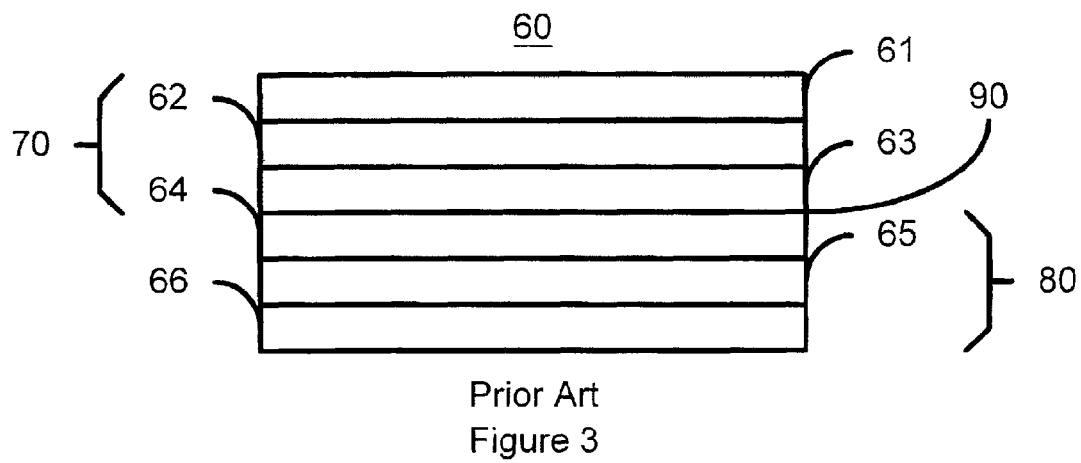
FIG. 3 is a diagram of a portion of a frame in a display.
Figure 4:
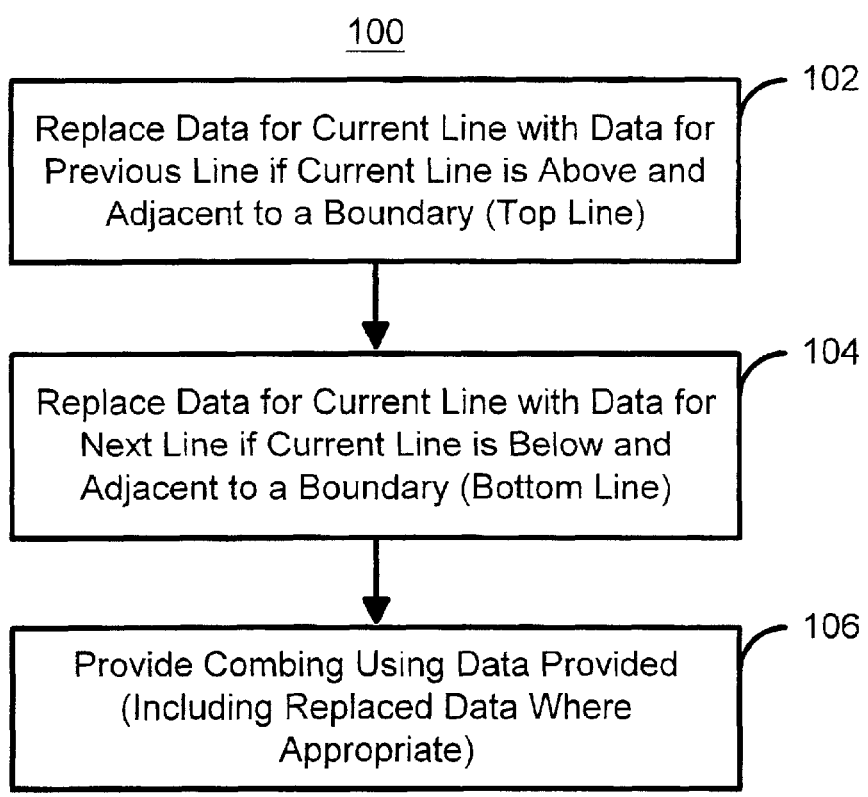
FIG. 4 is a flow chart of one embodiment of a method in accordance with the present invention for performing two-line combing for PAL chroma data.

To more particularly illustrate the method and system in accordance with the present invention, refer now to FIG. 4, depicting one embodiment of a method 100 in accordance with the present invention for performing two-line combing for PAL chroma data. The PAL chroma data is used for providing an image on a display having a plurality of lines. The display can depict a frame that includes one or more horizontal boundaries. Each horizontal boundary has a top edge and a bottom edge. A top line is at the top edge of the horizontal boundary, while a bottom line is at the bottom edge of the horizontal boundary. When the top line of each horizontal boundary is the current line, bottom line chroma data is replaced with previous line chroma data, via step 102. The previous line chroma data is data for the line before the top line. When the bottom line of each horizontal boundary is the current line, top line chroma data is replaced with subsequent line chroma data, via step 104. The subsequent line chroma data is the chroma data for the line after the bottom line. Combing is then performed using three lines of data, via step 106. The three lines include a previous line (which is replaced when the current line is the bottom line), a current line and a subsequent line (which is replaced when the current line is a top line). Thus, combing can be performed and the horizontal transitions can be accounted for. In particular, because chroma data for the bottom line, below the transition, is replaced when the current line is the top line, the chroma data originates at a similar portion of the display. Similarly, because chroma data for the top line, above the transition, is replaced when the current line is the bottom line, the chroma data originates at a similar portion of the display. As a result, combing can still be performed while accounting for horizontal boundaries.

Figure 5:
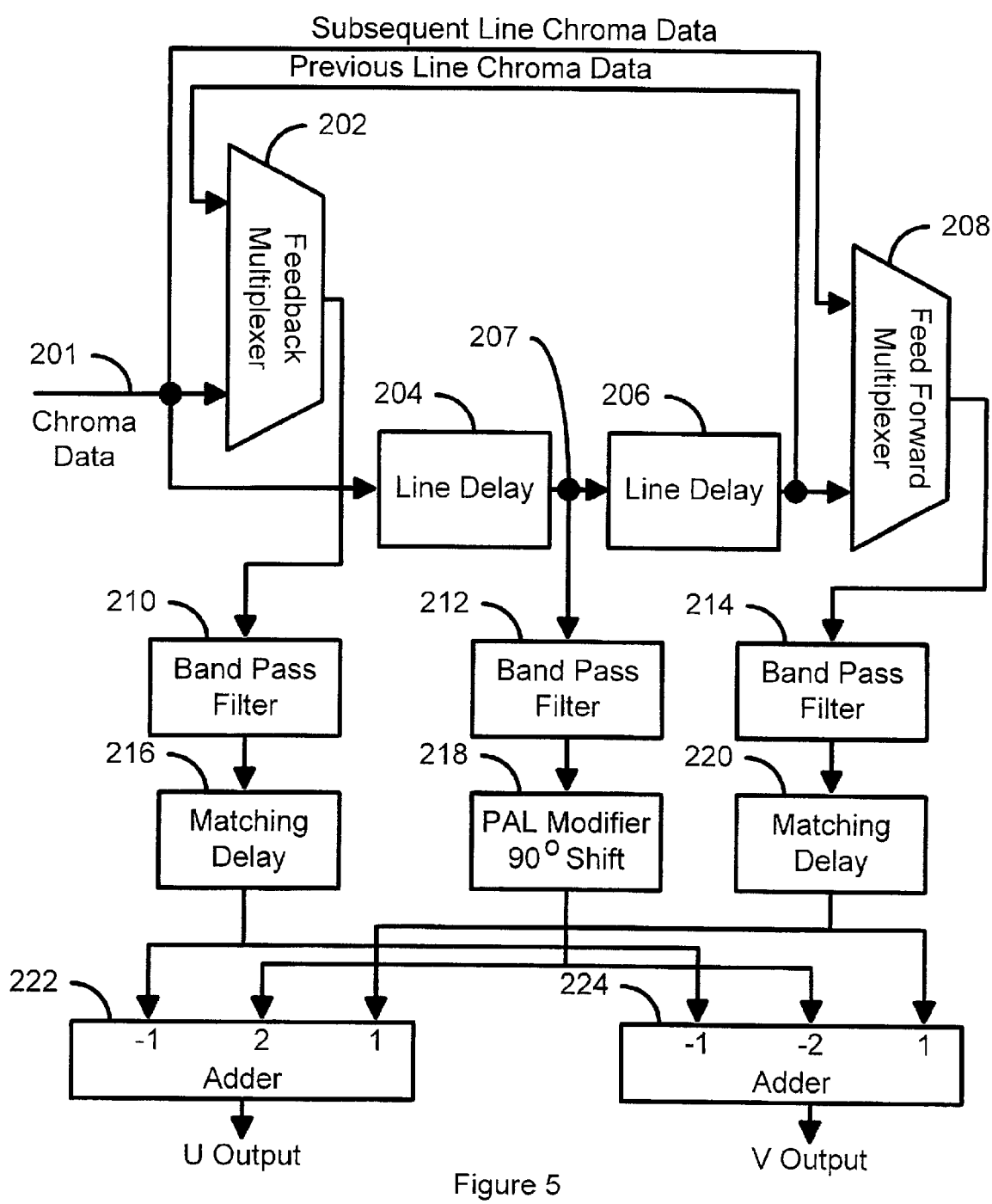
FIG. 5 is a block diagram of one embodiment of a system in accordance with the present invention for performing two-line combing for PAL chroma data.

FIG. 5 is a block diagram of one embodiment of a system 200 in accordance with the present invention for performing two-line combing for PAL chroma data. The system 200 preferably implements the method 100. The system 200 includes feedback multiplexer 202, first line delay 204, second line delay 206 and feed forward multiplexer 208. The system 200 also may include first BPF 210, second BPF 212 and third BPF 214. The BPFs 210, 212 and 214 preferably have a pass band of 3.1–5.7 MHz. The system 200 also includes PAL modifier ninety degree shift 218 and matching delays 216 and 220. The system 200 may also utilize adders 222 and 224.

The line delays 204 and 206 each delays the signal by a single line of the frame and includes an input and an output. The feedback multiplexer 202 includes an input coupled to the system input 201 and another input coupled to the output of the second line delay 206. The feed forward multiplexer 208 includes one input coupled to the output of the second line delay 206 and another input coupled to the input 201 of the system 200. The outputs of the multiplexers 202 and 208 are coupled to the BPFs 210 and 214, respectively. The output of the first line delay 204 and the input of the second line delay 206 are coupled to the BPF 212 via the node 207.

In operation, PAL chroma data that has been separated from PAL luma data is provided to the input 201 of the system 200. This chroma data is passed through the line delays 204 and 206. The PAL chroma data is provided from the node 207 to the BPF 212 and then to the PAL modifier ninety degree shift 218. This is considered to be chroma data for the current line. Consequently, the chroma data being input to the input 201, which has not been passed through any line delay 204 or 206 can be considered chroma data for a subsequent line. Similarly, data that is output from the second line delay 206 can be considered to be chroma data for a previous line. The feedback multiplexer 202 provides either subsequent line data from the input 201 or previous line data from the output of the second line delay 206 to the BPF 210. Similarly, the feed forward multiplexer 208 provides either subsequent line data from the input 201 or previous line data from the output of the second line delay 206 to the BPF 214.

Chroma data for the current line is provided from the node 207 to the BPF 212. When the current line is a top line, the line just above a horizontal transition, then the feedback multiplexer 202 provides fedback chroma data for a previous line (from the output of the line delay 206) to the BPF 210. When the current line is not a top line, then the feedback multiplexer 202 provides data for a subsequent line (from the input 201) to the BPF 210. When the current line is a bottom line, the line just below a horizontal transition, then the feed forward multiplexer 208 provides fed forward chroma data for a subsequent line (from the input 201) to the BPF 214. When the current line is not a bottom line, then the feed forward multiplexer 208 provides data for a previous line (from the output of the line delay 206) to the BPF 214. Consequently, horizontal transitions in a frame being rendered on a display can be accounted for using the feedback multiplexer 202 and the feed forward multiplexer 208. Thus, conventional three-line combing can be performed when the current line is neither a top line for a bottom line. In addition, two-line combing, in which previous line data or subsequent line data is reused, can be performed when the current line is the top line or the bottom line.

Data from the multiplexers 202 and 208 and the node 207 is passed through BPFs 210, 212 and 214, respectively. Data from the BPF 212 is provided to the PAL modifier ninety degree shift 218. To account for this shift, data from the BPFs 210 and 214 are provided to matching delays 216 and 220, respectively. The inverse of the data from the matching delay 216 is added with twice the adjusted data for the current line from the PAL modifier ninety degree phase shift 218 and with data from the matching delay 220 using the adder 222. Thus, the adder 222 performs combing and provides the U output. Similarly, the inverse of the data from the matching delay 216 is added with twice the inverse of the adjusted data for the current line from the PAL modifier ninety degree phase shift 218 and with data from the matching delay 220 using the adder 224. Thus, the adder 224 performs combing and provides the V output for chroma data.

Using the system 200 chroma data can be processed and U and V chroma data output. Furthermore, because the feedback multiplexer 202 and feed forward multiplexer 208 are used to provide feedback and fed forward data, either two-line or three-line combine can be performed. Horizontal transition can thus be accounted for in the processing of the chroma data. As a result, combing can accurately be performed both in the vicinity of and away from a horizontal boundary. Image quality is thereby improved.

A method and system has been disclosed for performing two-line combing for PAL chroma data. Software written according to the present invention is to be stored in some form of computer-readable medium, such as memory, CD-ROM or transmitted over a network, and executed by a processor. Consequently, a computer-readable medium is intended to include a computer readable signal which, for example, may be transmitted over a network. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for performing combing for PAL chroma data for a display having a plurality of lines, the display capable of depicting a frame including a horizontal boundary having a top edge and a bottom edge, a top line of the plurality of lines at the top edge of the horizontal boundary, a bottom line of the plurality of lines at the bottom edge of the horizontal boundary, the system comprising:

a feedback multiplexer having a first input, a second input and a first output, the first input receiving luma data for a current line;

a first line delay having a first delay input and a first delay output, the first delay input coupled with the first output;

a second line delay having a second delay input and a second delay output, the second delay input coupled to the first delay output, the second delay output coupled with the second input;

a feed forward multiplexer having a third input, a fourth input and a second output, the third input receiving the luma data for the current line, the fourth input coupled with the second delay output;

the feedback multiplexer being controlled to provide fedback chroma data from the second input to the first output when the current line is the top line and to provide the chroma data for the current line from the first input to the first output otherwise, the feed forward multiplexer being controlled to provide fed forward chroma data from the fourth input to the second output when the current line is the bottom line and to provide the chroma data from the current line to the second output otherwise.

2. The system of claim 1 further comprising:

a first adder for combining an inverted first data from the first output of the fedback multiplexer with twice a second data from the first delay output and third data from the second output of the feed forward multiplexer.

3. The system of claim 2 further comprising:

a second adder for combining the inverted first data from the first output of the fedback multiplexer with twice the second data from the first delay output inverted and third data from the second output of the feed forward multiplexer.

4. The system of claim 3 further comprising:

a first bandpass filter coupled to the first output of the feedback multiplexer and coupled with the first adder and the second adder;

a second bandpass filter coupled to the first delay output coupled and coupled with the first adder and the second adder; and a third bandpass filter coupled to the second output of feed forward multiplexer and coupled with the first adder and the second adder.

5. The system of claim 4 further comprising:

a PAL modifier phase shift block coupled to the second band pass filter, to the first adder and to the second adder.

6. The system of claim 5 further comprising:

a first matching delay coupled to the first bandpass filter, to the first adder and to the second adder; and a second matching delay coupled to the third bandpass filter, to the first adder and to the second adder.

7. A method for providing a system for performing combing for PAL chroma data for a display having a plurality of lines, the display capable of depicting a frame including a horizontal boundary having a top edge and a bottom edge, a top line of the plurality of lines at the top edge of the horizontal boundary, a bottom line of the plurality of lines at the bottom edge of the horizontal boundary, the method comprising the steps of:

(a) providing a feedback multiplexer having a first input, a second input and a first output, the first input receiving luma data for a current line;

(b) providing a first line delay having a first delay input and a first delay output, the first delay input coupled with the first output;

(c) providing a second line delay having a second delay input and a second delay output, the second delay input coupled to the first delay output, the second delay output coupled with the second input;

(d) providing a feed forward multiplexer having a third input, a fourth input and a second output, the third input receiving the luma data for the current line, the fourth input coupled with the second delay output;

the feedback multiplexer being controlled to provide fedback chroma data from the second input to the first output when the current line is the top line and to provide the chroma data for the current line from the first input to the first output otherwise, the feed forward multiplexer being controlled to provide fed forward chroma data from the fourth input to the second output when the current line is the bottom line and to provide the chroma data from the current line to the second output otherwise.

* * * * *